Patented Aug. 11, 1936

2,050,662

UNITED STATES PATENT OFFICE 2,050,662

N-SUBSTITUTION PRODUCTS OF 1.4-DIAMINOANTHRAQUINONES

Karl Koeberle, Christian Steigerwald, and Robert Schweizer, Ludwigshafen-on-the-Rhine, Germany, assignors to General Aniline Works, Inc., New York, N. Y., a corporation of Delaware No Drawing. Application October 22, 1935, Serial No. 46,208. In Germany September 19, 1933

11 Claims. (Cl. 260—60)

The present invention relates to N-substitution products of 1,4-diaminoanthraquinones and a process of producing same. This application is a continuation in part of our application Ser. No. 743,481.

We have found that N-substitution products of 1,4-diaminoanthraquinone, in which one hydrogen atom in each of the 1- and 4-amino groups is replaced by an alkyl, aralkyl, cycloalkyl, aryl or heterocyclic radicle the said radicles being different from each other are obtained by reacting anthraquinone derivatives of the general formula:—

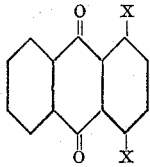

wherein the X's stand for equal or different groups of the class consisting of the hydroxyl, alkoxy, amino and alkylamino groups, with at least 2 molecular proportions of a mixture of at least two different primary amines in the presence of a leuco compound of a compound of the general formula shown above.

As anthraquinone derivatives having the general formula shown above may be mentioned by way of example the following compounds: 1,4-diaminoanthraquinone, 1,4-dihydroxyanthraquinone, 1-amino-4-hydroxyanthraquinone, 1-amino-4-ethoxyanthraquinone, 1,4-dimethoxyanthraquinone, 1-amino-4-methylaminoanthraquinone and 1,4-dimethyldiaminoanthraquinone. The amount of the leuco compound employed may be varied within wide limits. It is, however, preferable to use about 10 to 30 per cent thereof calculated on the quantity of the anthraquinone compounds employed as initial substances.

The amines suitable for the process according to the present invention may be chosen from any class of primary amines, the amines containing the amino group attached to a carbon atom in aliphatic combination being especially suitable. Amino compounds containing besides the free amino group substituents or ring members having a strong acidifying influence upon the molecule of the said compounds are less suitable for this reaction. Due to this fact, especially amino compounds containing cyclic bound keto groups such as aminoanthraquinone or aminobenzanthrone are practically unsuitable as primary amines for the purpose of this invention.

The reaction is carried out with advantage in the presence of a diluent such as water, aliphatic alcohols of low molecular weight, ethers, esters, ketones, hydrocarbons or halogenated hydrocarbons. In some cases it is preferable to work at superatmospheric pressure. The reaction even takes place at slightly elevated temperature. Generally speaking the reaction temperature depends on the nature of the initial substances, temperatures from 60° to 150° C. being especially suitable.

The reaction products according to this invention are generally obtained in very good yields and in a high state of purity. If desired, they may be purified by sublimation or recrystallization from the usual organic solvents. In order to remove any parts of leuco compound present in the resulting product, the reaction mixture may be aftertreated with an oxidizing agent. It is preferable to lead oxygen or air through the reaction mixture before separating the reaction product. A small amount of a copper compound and of a secondary or tertiary base is advantageously added during the oxidation.

In nearly all cases the compounds thus obtainable are especially suitable for dyeing cellulose esters and ethers or for coloring fats, oils, waxes, lacquers, liquid or solid hydrocarbons and artificial compositions of various kinds.

The following examples will further illustrate how the said invention may be carried out in practice, but the invention is not restricted to these examples. The parts are by weight.

Example 1

A mixture of 118.5 parts of 1,4-dihydroxyanthraquinone, 31.5 parts of leuco-1,4-diaminoanthraquinone, 90 parts of a 25 per cent aqueous solution of methylamine, 42.8 parts of normal-propylamine and 900 parts of methanol is heated at from 60° to 65° C. while stirring. The reaction mixture is allowed to cool, and the product formed is filtered off by suction, washed with methanol and dried. The 1-methylamino-4-normal-propylamino-anthraquinone thus obtained in the form of a blue powder dyes acetate artificial silk powerful blue shades.

Similar dyestuffs are obtained by employing, instead of a mixture of methylamine and normal-propylamine, other mixtures of alkylamines, as for example mixtures of methylamine and ethylamine, methylamine and normal-butylamine, ethylamine and normal-propylamine, normal-propylamine and normal-butylamine, methylamine and normal-amylamine, methylamine and gamma-dimethylaminopropylamine.

Example 2

A mixture of 79 parts of 1,4-dihydroxyanthraquinone, 21 parts of leuco-1,4-diaminoanthraquinone, 60 parts of a 25 per cent aqueous solution of methylamine, 28 parts of ethanolamine and 700 parts of isobutyl alcohol is heated at from 70° to 80° C. for about 12 hours while stirring. The reaction mixture is then allowed to cool, and the product formed is filtered off by suction, washed with methanol and dried. The 1-methylamino-4-hydroxyethylaminoanthraquinone thus obtained in the form of a blue crystalline powder dyes acetate artificial silk deep blue shades.

Similar dyestuffs are obtained by employing, for example, instead of the mixture of methylamine and ethanolamine, the following mixtures of amines: methylamine and beta-hydroxypropylamine, methylamine and gamma-hydroxypropylamine, methylamine and beta-hydroxynormal-butylamine, ethylamine and ethanolamine, normal-propylamine and ethanolamine, normal-butylamine and beta-hydroxypropylamine, ethanolamine and beta-hydroxypropylamine, beta-hydroxypropylamine and gamma-hydroxypropylamine.

Example 3

A mixture of 79 parts of 1,4-diaminoanthraquinone, 21 parts of leuco-1,4-diaminoanthraquinone, 90 parts of an aqueous 25 per cent solution of methylamine, 48 parts of normal-butylamine and 700 parts of isobutyl alcohol is heated in a closed vessel at 140° C. for about 10 hours, while stirring. The reaction mixture is allowed to cool, the resulting precipitate is filtered off by suction, washed with methanol and dried. The final product is obtained in the form of a blue powder which dyes acetate artificial silk strong blue shades. The same product is obtained by employing 1-amino-4-hydroxy or 1-amino-4-methoxy-anthraquinone instead of 1,4-diaminoanthraquinone.

Example 4

A mixture of 79 parts of 1,4-dihydroxyanthraquinone, 21 parts of leuco-1,4-diaminoanthraquinone, 28 parts of ethanolamine, 50 parts of para-phenylenediamine and 700 parts of cyclohexanol is heated at from 150° to 160° C. for about 15 hours while stirring. After cooling, the reaction mixture is diluted with methanol and the resulting precipitate is filtered off by suction, washed with methanol and dried. The resulting product is a blue powder which dyes acetate artificial silk blue-green shades.

Instead of the mixture of ethanolamine and para-phenylene diamine other mixtures of aliphatic and aromatic amines may also be employed. The dyestuffs obtained dye acetate artificial silk from blue to green shades, depending on the particular amine employed.

Example 5

A mixture of 80 parts of 1,4-dihydroxyanthraquinone, 20 parts of leuco-1,4-diaminoanthraquinone, 60 parts of a 25 per cent aqueous solution of methylamine, 47 parts of benzylamine and 800 parts of isobutyl alcohol is heated at from 60° to 70° C. for about 20 hours while stirring. The reaction mixture is then allowed to cool, and the resulting product is filtered off by suction, washed with methanol and dried. The 1-methylamino-4-benzylaminoanthraquinone thus obtained is a blue powder which dyes acetate artificial silk blue shades.

By employing other alkylamines instead of methylamine, as for example ethylamine, normal-propylamine, normal-butylamine, amylamine, ethanolamine, beta-hydroxypropylamine, and beta-phenylethylamine instead of benzylamine the correspondingly substituted 1,4-diaminoanthraquinones are obtained.

Example 6

A mixture of 80 parts of 1,4-dihydroxyanthraquinone, 20 parts of leuco-1,4-diaminoanthraquinone, 60 parts of a 25 per cent aqueous solution of methylamine, 44 parts of cyclohexylamine and 800 parts of isobutyl alcohol is heated while stirring at from 60° to 70° C. for about 20 hours. The reaction mixture is then allowed to cool, and the resulting product is filtered off by suction, washed with methanol and dried. The 1-methylamino-4-cyclohexylaminoanthraquinone thus obtained is a blue powder which dyes acetate artificial silk blue shades.

By employing other alkylamines instead of methylamine, as for example ethylamine, normal-propylamine, normal-butylamine, amylamines, hexylamines, ethanolamine, hydroxypropylamines, monophenylethylenediamine or mono-hydroxyethylethylenediamine, the correspondingly substituted 1,4-diaminoanthraquinones are obtained which in part are suitable for dyeing acetate artificial silk and in part for coloring hydrocarbons, oils, fats, waxes, paraffin waxes and artificial compositions of various kinds.

Example 7

A mixture of 80 parts of 1,4-dihydroxyanthraquinone, 20 parts of leuco-1,4-diaminoanthraquinone, 29 parts of ethanolamine, 34 parts of normal-butylamine and 800 parts of methanol is heated at about 60° C. for about 20 hours while stirring. The reaction mixture is then allowed to cool, the resulting 1-hydroxyethylamino-4-normal-butylaminoanthraquinone is filtered off by suction, washed with methanol and dried. It is a blue powder which dyes acetate artificial silk blue shades.

Example 8

A mixture of 79 parts of 1,4-dihydroxyanthraquinone, 21 parts of leuco-1,4-diaminoanthraquinone, 29 parts of ethanolamine, 33 parts of 1,2-propanolamine and 700 parts of isobutyl alcohol is heated while stirring at 100° C. for 20 hours. After cooling the 1-hydroxyethylamino-4-beta-hydroxypropylaminoanthraquinone is filtered off by suction, washed with methanol and dried. It is a blue powder which dyes acetate artificial silk powerful blue shades.

Example 9

A mixture of 80 parts of 1,4-dihydroxyanthraquinone, 20 parts of leuco-1,4-diaminoanthraquinone, 29 parts of ethanolamine, 33 parts of 1,3-propanolamine and 800 parts of isobutyl alcohol is heated while stirring at 100° C. for 20 hours. After cooling the 1-hydroxyethylamino-4-gamma-hydroxypropylaminoanthraquinone is filtered off by suction, washed with methanol and dried. It is a blue powder which dyes acetate artificial silk powerful blue shades.

Example 10

A mixture of 85 parts of 1,4-dihydroxyanthraquinone, 15 parts of leuco-1,4-diaminoanthraquinone, 33 parts of 1.2-propanolamine, 33 parts of 1,3-propanolamine and 800 parts of isobutyl alcohol is heated while stirring at 100° C. for 20 hours. After cooling the 1-beta-hydroxypropyl-amino-4-gamma-hydroxypropylaminoanthraquinone is filtered off by suction, washed with methanol and dried. It is a blue powder, which dyes acetate artificial silk powerful blue shades.

By employing mixtures of 1,2-propanolamine or 1,3-propanolamine with butanolamines instead of the mixture mentioned in the first paragraph similar dyestuffs are obtained.

*Example 11*

A mixture of 80 parts of 1,4-dihydroxyanthraquinone, 20 parts of leuco-1,4-dihydroxyanthraquinone, 26 parts of normal propylamine, 34 parts of normal-butylamine and 800 parts of methanol is boiled while stirring for 20 hours. After cooling the 1-normal-propylamino-4-normal-butylaminoanthraquinone is filtered off by suction, washed with methanol and dried. It is a blue powder which is especially suitable for coloring liquid and solid hydrocarbons such as benzines or paraffin waxes blue shades of color being obtained.

By employing other mixtures of aliphatic amines the correspondingly substituted 1,4-diaminoanthraquinones are obtained. The 1,4-dihydroxyanthraquinone can be replaced by 1,4-diaminoanthraquinone. In this case it is preferable to work in a closed vessel at about 140° C.

*Example 12*

A mixture of 80 parts of 1,4-dihydroxyanthraquinone, 20 parts of leuco-1,4-dihydroxyanthraquinone, 60 parts of a 25 per cent aqueous solution of ethylamine, 53 parts of beta-phenylethylamine and 800 parts of isobutyl alcohol is heated while stirring at from 60° to 70° C. for 20 hours. After cooling the 1-ethylamino-4-beta-phenylethylaminoanthraquinone is filtered off by suction, washed with methanol and dried. It is a blue powder which is suitable for coloring paraffin waxes or artificial compositions blue shades of color being obtained.

The correspondingly substituted 1.4-diaminoanthraquinones are obtained by employing benzylamine or cyclohexylamine instead of beta-phenylethylamine.

*Example 13*

A mixture of 80 parts of 1,4-dihydroxyanthraquinone, 20 parts of leuco-1,4-dihydroxyanthraquinone, 41 parts of aniline, 47 parts of para-toluidine, 80 parts of boric acid and 900 parts of butanol is boiled while stirring for 20 hours. After cooling the product separated is filtered off by suction, washed with methanol and dried. A blue powder is thus obtained which is probably 1 - anilido-4-para-toluido - anthraquinone; after treating with sulfonating agents a product is obtained which dyes wool from an acid bath blue green shades.

By employing other mixtures of aromatic amines the correspondingly substituted 1,4-diaminoanthraquinones are obtained.

*Example 14*

A mixture of 80 parts of 1,4-dihydroxyanthraquinone, 20 parts of leuco-1-amino-4-hydroxyanthraquinone, 60 parts of a 25 per cent aqueous solution of methylamine, 29 parts of ethanolamine and 800 parts of isobutyl alcohol is heated while stirring at from 60° to 70° C. for 20 hours. After cooling the reaction product is filtered off by suction, washed with methanol and dried. It is a blue powder.

*Example 15*

A mixture of 20 parts of leuco-1,4-dimethylaminoanthraquinone, 80 parts of 1,4-dihydroxyanthraquinone, 60 parts of a 25 per cent aqueous solution of methylamine, 29 parts of ethanolamine and 800 parts of isobutyl alcohol is heated while stirring at from 60° to 70° C. for 20 hours. After cooling the 1-methylamino-4-hydroxyethylaminoanthraquinone formed is filtered off by suction, washed with methanol and dried. It is a blue powder, which dyes acetate artificial silk powerful blue shades.

*Example 16*

A mixture of 20 parts of leuco-1,4-diaminoanthraquinone, 80 parts of 1,4-dimethylaminoanthraquinone, 20 parts of a 25 per cent aqueous solution of methylamine, 34 parts of normal-butylamine and 800 parts of methanol is heated while stirring at 60° to 70° C. for 20 hours. After cooling the 1-methylamino-4-normal-butylaminoanthraquinone formed is filtered off by suction, washed with methanol and dried. It is a blue powder, which dyes acetate artificial silk powerful blue shades.

What we claim is:

1. A process of producing 1,4-diaminoanthraquinones corresponding to the general formula:

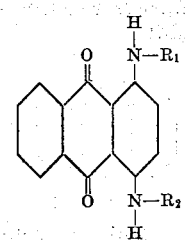

wherein $R_1$ and $R_2$ stand for different organic radicles which comprises reacting a compound of the general formula:

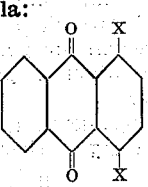

wherein the X's stand for equal or different groups of the class consisting of the hydroxyl, alkoxy, amino and alkylamino groups in the presence of a leuco compound of a compound of the second general formula shown above, with at least two molecular proportions of a mixture of at least two different primary amines.

2. A process of producing 1,4-diaminoanthraquinones corresponding to the general formula:

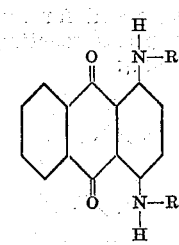

wherein $R_1$ and $R_2$ stand for different organic radicles the carbon atom directly attached to the N-atom shown being aliphatically combined therewith which comprises reacting a compound of the general formula:

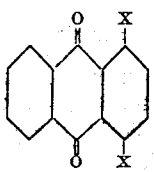

wherein the X's stand for equal or different groups of the class consisting of the hydroxyl, alkoxy, amino and alkylamino groups in the presence of a leuco compound of a compound of the second general formula shown above, with at least two molecular proportions of a mixture of at least two different primary amines, the amino group of which is attached to an aliphatically combined carbon atom.

3. A process of producing 1,4-diaminoanthraquinones corresponding to the general formula:

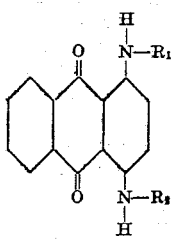

wherein $R_1$ and $R_2$ stand for different alkyl groups which comprises reacting a compound of the general formula:

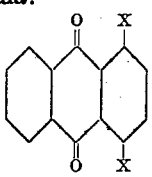

wherein the X's stand for equal or different groups of the class consisting of the hydroxyl, alkoxy, amino and alkylamino groups in the presence of a leuco compound of a compound of the second general formula shown above, with at least two molecular proportions of a mixture of at least two different primary amines of the aliphatic series.

4. A process of producing 1,4-diaminoanthraquinones corresponding to the general formula:

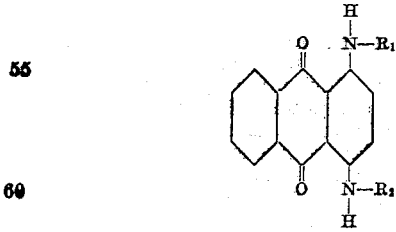

wherein $R_1$ and $R_2$ stand for different organic radicles which comprises reacting a compound of the general formula:

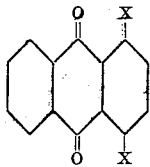

wherein the X's stand for equal or different groups of the class consisting of the hydroxyl, alkoxy, amino and alkylamino groups in the presence of a leuco compound of a compound of the second general formula shown above, with at least two molecular proportions of a mixture of at least two different primary amines, in the presence of a diluent.

5. A process of producing 1,4-diaminoanthraquinones corresponding to the general formula:

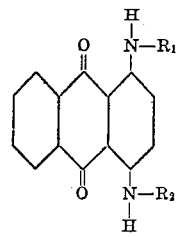

wherein $R_1$ and $R_2$ stand for different organic radicles which comprises reacting a compound of the general formula:

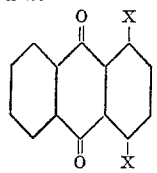

wherein the X's stand for equal or different groups of the class consisting of the hydroxyl, alkoxy, amino and alkylamino groups in the presence of a leuco compound of a compound of the second general formula shown above, with at least two molecular proportions of a mixture of at least two different primary amines the amount of the leuco compound being at least 10 per cent calculated on the amount of the anthraquinone compounds employed as starting materials, in the presence of a diluent.

6. A process of producing 1,4-diaminoanthraquinones corresponding to the general formula:

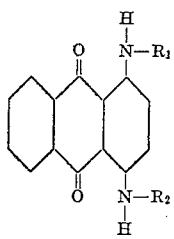

wherein $R_1$ and $R_2$ stand for different organic radicles which comprises reacting a compound of the general formula:

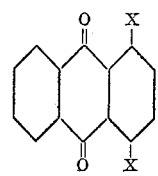

wherein the X's stand for equal or different groups of the class consisting of the hydroxyl, alkoxy, amino and alkylamino groups in the presence of a leuco compound of a compound of the second general formula shown above, with at least two molecular proportions of a mixture of at least two different primary amines the amount of the leuco compound being at least 10 per cent calculated on the amount of the anthraquinone compounds employed as starting materials in the presence of a diluent at a temperature between about 60° and about 140° C.

7. A process of producing 1,4-diaminoanthraquinones corresponding to the general formula:

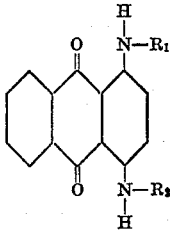

wherein R₁ and R₂ stand for different organic radicles which comprises reacting a compound of the general formula:

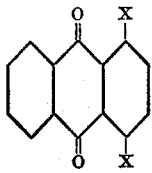

wherein the X's stand for equal or different groups of the class consisting of the hydroxyl, alkoxy, amino and alkylamino groups in the presence of leuco-1,4-diaminoanthraquinone and a diluent at a temperature between about 60° and about 120° C. with at least two molecular proportions of a mixture of at least two different primary amines.

8. 1,4-diaminoanthraquinones corresponding to the general formula:

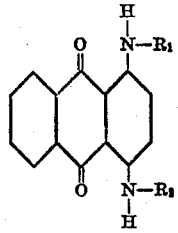

wherein R₁ and R₂ stand for hydroxyalkyl groups different from each other.

9. The 1,4-diaminoanthraquinone corresponding to the formula:

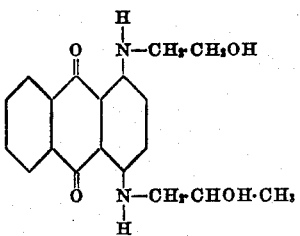

10. The 1,4-diaminoanthraquinone corresponding to the formula:

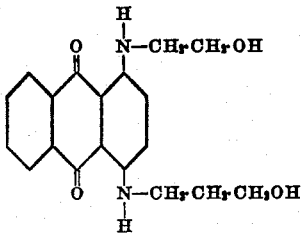

11. The 1,4-diaminoanthraquinone corresponding to the formula:

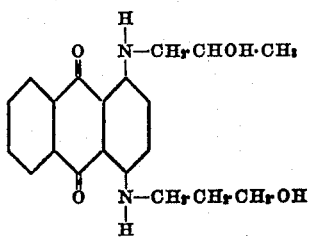

KARL KOEBERLE.
CHRISTIAN STEIGERWALD.
ROBERT SCHWEIZER.